(12) United States Patent
Sasaki et al.

(10) Patent No.: US 10,353,072 B2
(45) Date of Patent: Jul. 16, 2019

(54) LASER SCANNER CONTROLLING DEVICE, LASER SCANNER CONTROLLING METHOD, AND LASER SCANNER CONTROLLING PROGRAM

(71) Applicant: TOPCON CORPORATION, Itabashi-ku (JP)

(72) Inventors: You Sasaki, Itabashi-ku (JP); Tadayuki Ito, Itabashi-ku (JP)

(73) Assignee: TOPCON CORPORATION, Tokyo (JP)

(*) Notice: Subject to any disclaimer, the term of this patent is extended or adjusted under 35 U.S.C. 154(b) by 448 days.

(21) Appl. No.: 15/187,291

(22) Filed: Jun. 20, 2016

(65) Prior Publication Data

US 2016/0377707 A1 Dec. 29, 2016

(30) Foreign Application Priority Data

Jun. 26, 2015 (JP) ................. 2015-128529

(51) Int. Cl.
| | | |
|---|---|---|
| *G01C 3/08* | (2006.01) | |
| *G01S 17/89* | (2006.01) | |
| *G01S 7/497* | (2006.01) | |
| *G01S 17/02* | (2006.01) | |
| *G01S 17/42* | (2006.01) | |
| *G01S 7/486* | (2006.01) | |
| *G01S 7/491* | (2006.01) | |

(52) U.S. Cl.
CPC ............ *G01S 17/89* (2013.01); *G01S 7/486* (2013.01); *G01S 7/497* (2013.01); *G01S 7/4912* (2013.01); *G01S 17/023* (2013.01); *G01S 17/42* (2013.01)

(58) Field of Classification Search
CPC ........ G01S 7/497; G01S 7/486; G01S 7/4912; G01S 17/89; G01S 17/023; G01S 17/42
USPC ........................................ 356/4.01
See application file for complete search history.

(56) References Cited

U.S. PATENT DOCUMENTS

| | | |
|---|---|---|
| 2009/0241358 A1 | 10/2009 | Ohtomo et al. |
| 2010/0256940 A1 | 10/2010 | Ogawa et al. |
| 2013/0236107 A1 | 9/2013 | Fukaya et al. |
| 2014/0092207 A1 | 4/2014 | Saito et al. |
| 2014/0333468 A1* | 11/2014 | Zhu .................. G01S 17/95 342/54 |

FOREIGN PATENT DOCUMENTS

| | | |
|---|---|---|
| JP | 2008-268004 | 11/2008 |
| JP | 2010-151682 | 7/2010 |
| JP | 2012-204982 | 10/2012 |
| JP | 2012-242317 | 12/2012 |
| JP | 2013-186816 | 9/2013 |
| JP | 2014-71860 | 4/2014 |

* cited by examiner

*Primary Examiner* — Mark Hellner
(74) *Attorney, Agent, or Firm* — XSENSUS LLP

(57) ABSTRACT

Detection of sunlight as noise is avoided in obtaining point clouds by using a laser scanner. A laser scanner controlling device includes a sun direction calculating unit 115, a brightness measuring unit 116, and a scan condition setting unit 118. The sun direction calculating unit 115 calculates the direction of the sun. The brightness measuring unit 116 measures the brightness of an image that contains the direction of the sun. The scan condition setting unit 118 sets a condition for restricting laser scanning in the direction of the sun when the brightness is not less than a predetermined threshold value.

3 Claims, 3 Drawing Sheets

LASER SCANNER CONTROLLING DEVICE, LASER SCANNER CONTROLLING METHOD, AND LASER SCANNER CONTROLLING PROGRAM

BACKGROUND OF THE INVENTION

Technical Field

The present invention relates to a technique for obtaining three-dimensional point cloud position data by using a laser scanner (LIDAR).

Background Art

Technology for a MMS (Mobile Mapping System) is publicly known (for example, refer to Japanese Unexamined Patent Application Laid-Open No. 2012-242317). In the MMS, a vehicle is equipped with a GNSS unit, a camera, a laser scanner, an IMU (Inertial Navigation Unit), etc., and the vehicle obtains three-dimensional data and images of the surroundings while travelling, whereby a three-dimensional model of the travelling environment is obtained. The three-dimensional data that is obtained by the MMS may be used for city planning, civil engineering work, disaster prevention plans, etc.

In the case of obtaining three-dimensional point cloud position data by using a laser scanner, noise is undesirably contained in a point cloud. Therefore, it is essential to effectively reduce and remove noise points from point clouds. There may be various sources of noise in point clouds, but in cases of outdoor measurement, the sun is the primary noise source. For example, in a case of using infrared light as a light source for a laser scanner, sunlight may be mistakenly detected as measured light and is processed as noise.

As a measure for solving this problem, a method of visually selecting such noise points after point clouds are generated and deleting the noise points from data, a method of performing appropriate filtering processing on point clouds and removing noise points, etc., may be performed. However, each of these methods requires performing some processing steps after the point clouds are generated, and each of these methods takes long work time and is complicated.

SUMMARY OF THE INVENTION

In view of these circumstances, the present invention is to provide a technique for reducing detection of sunlight as noise in obtaining point clouds using a laser scanner.

A first aspect of the present invention provides a device for controlling a laser scanner that is configured to scan the sun, and the device includes a calculating unit that is configured to calculate the direction of the sun, a brightness measuring unit that is configured to measure the brightness of an image that contains the direction of the sun, and a scan condition setting unit that is configured to set a condition for restricting laser scanning in the direction of the sun when the brightness is not less than a predetermined threshold value.

According to the first aspect of the present invention, misdetection of sunlight as measured light is greatly reduced. As the conditions restricting laser scanning, the following conditions may be described.

(1) Inhibit emission of measurement laser light.
(2) Perform emission of measurement laser light, but inhibit detection of the measurement laser light.
(3) Do not use detected measured light that may include sunlight, as measured light, and use it as another data.

A second aspect of the present invention provides a method for controlling a laser scanner that is configured to scan the sun, and the method includes calculating a direction of the sun, measuring the brightness of an image that contains the direction of the sun, and setting a scan condition for restricting laser scanning in the direction of the sun when the brightness is not less than a predetermined threshold value.

A third aspect of the present invention provides a computer program product including a non-transitory computer-readable medium storing computer-executable program codes for controlling a laser scanner that is configured to scan the sun. The computer-executable program codes include program code instructions for calculating a direction of the sun, measuring the brightness of an image that contains the direction of the sun, and setting a scan condition for restricting laser scanning in the direction of the sun when the brightness is not less than a predetermined threshold value.

According to the present invention, a technique for reducing detection of sunlight as noise in obtaining point clouds using a laser scanner is provided.

PREFERRED EMBODIMENTS OF THE INVENTION

Structure

Figure 1:
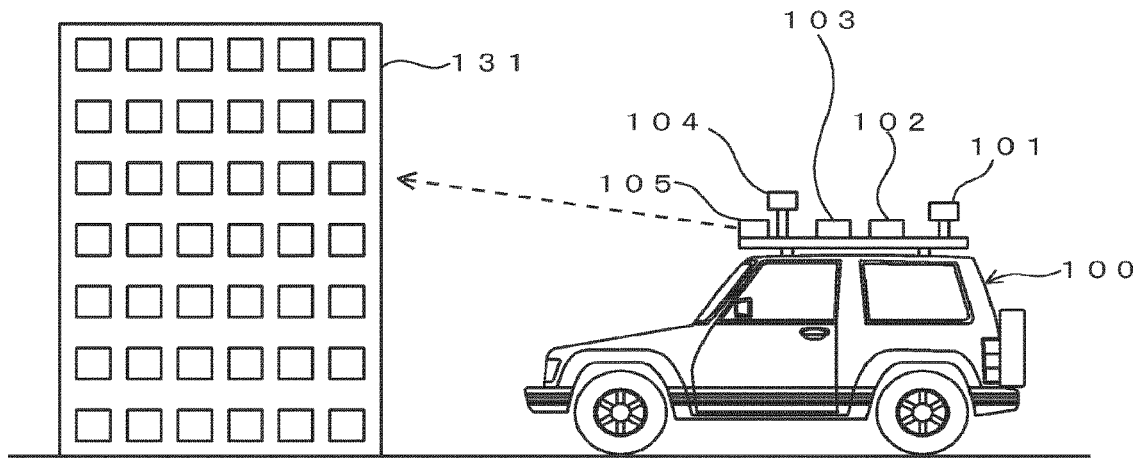
FIG. 1 is a conceptual diagram showing an outline of a MMS (Mobile Mapping System).

FIG. 1 shows a vehicle 100 that is equipped with an antenna 101, an IMU 102, an operating device 103, a camera 104, and a laser scanner 105. FIG. 1 shows a condition in which the laser scanner 105 obtains three-dimensional point cloud position data of a building 131.

The antenna 101 receives navigation signals from a navigation satellite such as a GPS satellite or the like. The navigation signals contain transmission times of the navigation signals, orbital information of the navigation satellite, code information which is used for measuring propagation times of the navigation signals and the like, etc. The applicable navigation satellite is not limited to the GPS satellite and may be a navigation satellite of another type. As the navigation satellite, a navigation satellite that complements a GPS system may also be used. This type of navigation satellite includes a navigation satellite that is controlled by a qusai-zenith satellite system.

The IMU (Inertial Measurement Unit) 102 is an inertial navigation unit, and it obtains information of acceleration applied to the vehicle and information of changes in the attitude of the vehicle 100. The operating device 103 is hardware that functions as a computer, and it has the structure shown in FIG. 2, which is described later, and performs processing shown in FIG. 3.

The camera 104 is a panoramic camera and can photograph moving images of the entirety of the surroundings including an overhead direction ($2\pi$ space). The panoramic camera may be as disclosed in Japanese Unexamined Patent Applications Laid-Open Nos. 2012-204982 and 2014-071860, for example. Although details are not given here, data of the moving images that are taken by the camera 104 are linked with three-dimensional point cloud position data that is measured by the laser scanner 105, and they are used for generating three-dimensional information. Exterior orientation parameters (position and attitude) of the camera 104 and the laser scanner 105 (described later) relative to the vehicle 100 (in this case, the position of the IMU 102) are preliminarily measured and are known. In addition, the camera 104 and the laser scanner 105 (described later) are arranged as close as possible to each other.

The laser scanner 105 performs laser scanning on the entirety of the circumstances around the laser scanner 105 ($2\pi$ space) and obtains three-dimensional point cloud position data of the conditions surrounding the laser scanner 105. The three-dimensional point cloud position data is obtained by calculating the three-dimensional position at each of points that reflect the measurement laser light. The three-dimensional point cloud position data provides three-dimensional information of an object as a set of points, of which three-dimensional positions are identified. The laser scanner may be as disclosed in Japanese Unexamined Patent Application Laid-Open Nos. 2008-268004 and 2010-151682, for example.

Figure 2:
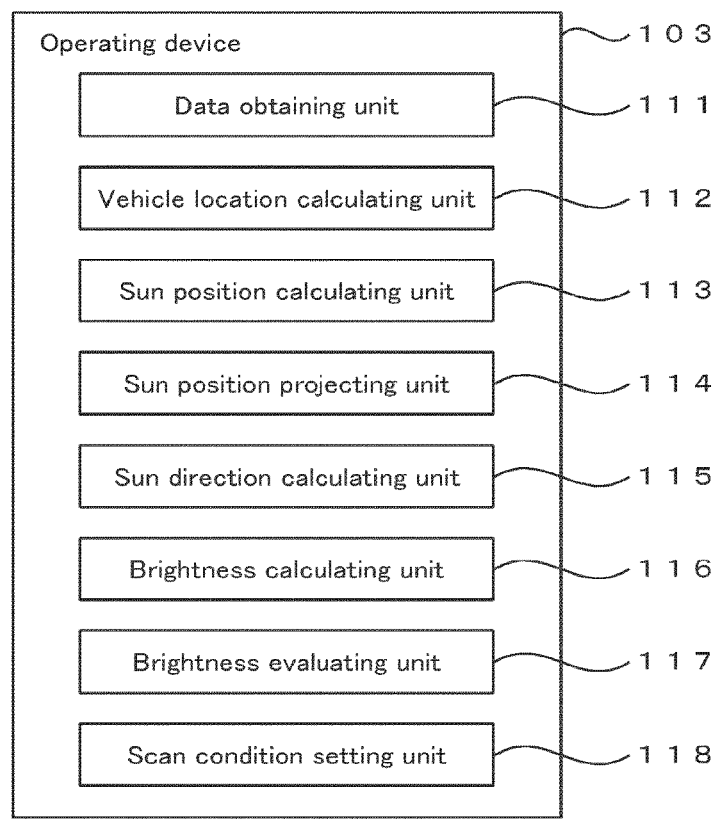
FIG. 2 is a block diagram of an operating device in an embodiment.

The operating device 103 is hardware that functions as a computer and has each of the functional units shown in FIG. 2. Each of the functional units shown in FIG. 2 may be constructed of software or may be composed of a dedicated arithmetic circuit. In addition, a functional unit that is constructed of software and a functional unit that is composed of a dedicated arithmetic circuit may be used together. For example, each of the functional units shown in FIG. 2 is composed of a CPU (Central Processing Unit), an ASIC (Application Specific Integrated Circuit), and a PLD (Programmable Logic Device) such as an FPGA (Field Programmable Gate Array). The operating device 103 also includes a storage unit such as a solid electronic memory, a hard disk drive, or the like, and various types of interface circuits.

FIG. 2 shows a block diagram of the operating device 103. The operating device 103 includes a data obtaining unit 111, a vehicle location calculating unit 112, a sun position calculating unit 113, a sun position projecting unit 114, a sun direction calculating unit 115, a brightness measuring unit 116, a brightness evaluating unit 117, and a scan condition setting unit 118.

The data obtaining unit 111 receives navigation signals that are received by the antenna 101, data of images that are taken by the camera 104, and three-dimensional point cloud position data that is obtained by the laser scanner 105. The vehicle location calculating unit 112 calculates the location of the vehicle 100 based on the navigation signals which are received by the antenna 101 from the GNSS navigation satellite. The location of the vehicle 100 is calculated based on the position of the IMU 102. In the calculation of the location of the vehicle 100, various kinds of beacon signals may also be used in addition to the data of the GNSS. As an applicable system in addition to the GNSS, a VICS (Vehicle Information and Communication System) (registered trademark) may be described. The location and the attitude of the vehicle can also be calculated by using moving images that are taken by the camera. Such technique is disclosed in Japanese Unexamined Patent Application Laid-Open No. 2013-186816, for example.

The sun position calculating unit 113 calculates the position of the sun on the celestial sphere surface as viewed from the camera 103. The position of the sun is calculated by using a dedicated program. The orbital information of the sun on the celestial sphere surface can be obtained from publicly known astronomical information. The orbital information of the sun can be obtained from a website of the Jet Propulsion Laboratory (U.S.) (http://www.jpl.nasa.gov/), for example. The method of calculating the position of the sun may be found in the Proceedings of Annual Research Meeting, Tohoku Chapter, Architectural Institute of Japan (68), published on Jun. 10, 2005, (news-sv.aij.or.jp/kankyo/s13/OLDHP/matsu0512.pdf), for example.

The sun position projecting unit 114 projects the position of the sun, which is calculated by the sun position calculating unit 113, on the celestial sphere surface in which the location of the camera 104 is at the center. Specifically, the calculated position of the sun is projected on the image that contains the direction of the sun. The sun direction calculating unit 115 calculates the direction of the sun as viewed from the camera 104, based on the projected position of the sun on the celestial sphere surface. The brightness measuring unit 116 measures the brightness of the image that contains the calculated direction of the sun. The brightness evaluating unit 117 evaluates the value of the brightness that is measured by the brightness measuring unit 116, based on a specific condition. The scan condition setting unit 118 sets the scan condition of the laser scanner 105 based on the result of the evaluation that is performed by the brightness evaluating unit 117.

Example of Processing

Figure 3:
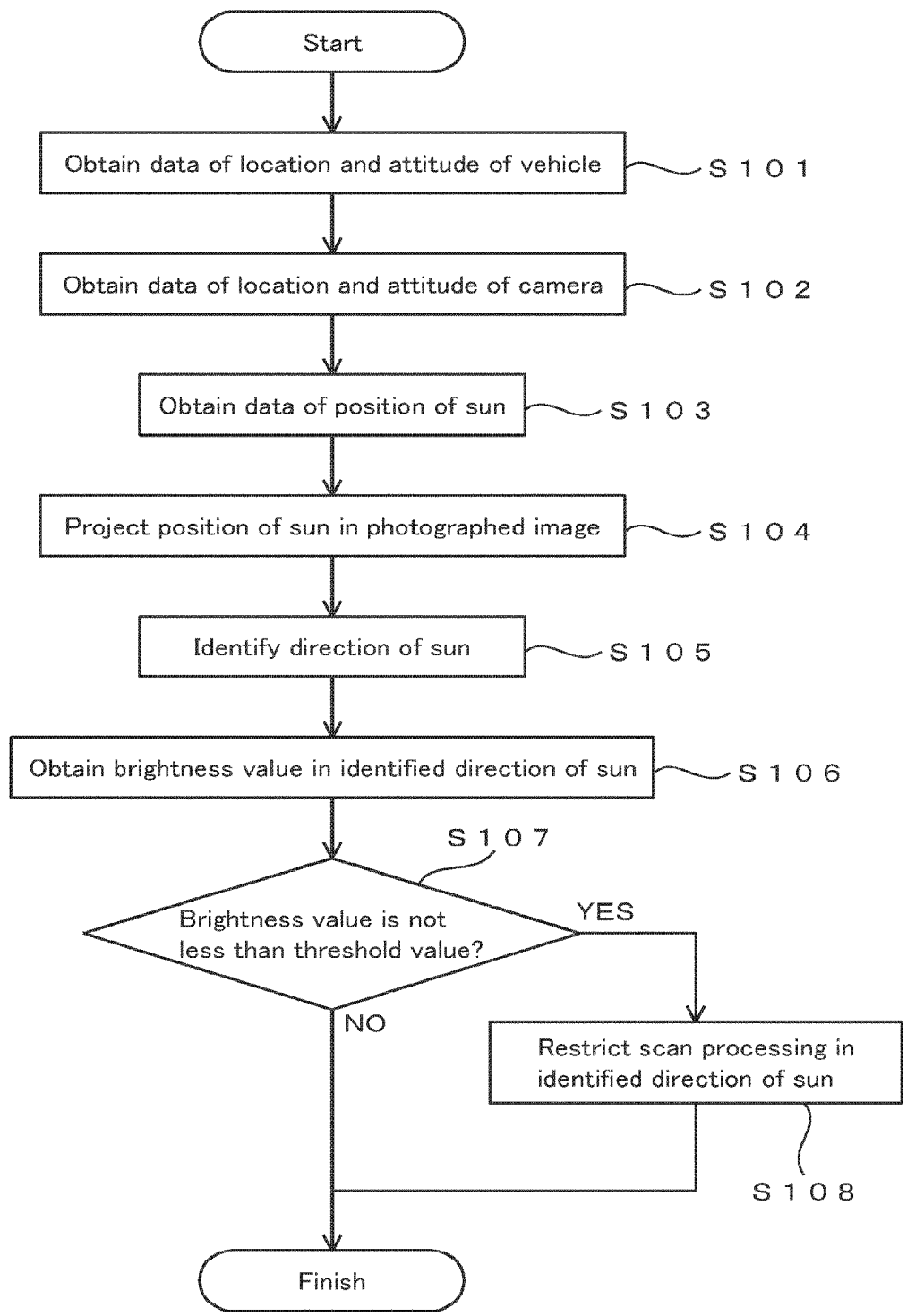
FIG. 3 is a flow chart showing an example of a processing procedure.

FIG. 3 shows an example of a processing procedure. Programs for executing the processing shown in FIG. 3 are stored in an appropriate storage medium and are executed by the hardware shown in FIG. 2. When the processing starts, first, data of location and attitude of the vehicle at time "t" is obtained (step S101). The data of the location of the vehicle is calculated by the vehicle location calculating unit 112, and the data of the attitude of the vehicle is obtained from the IMU 102. The time "t" is set at a predetermined time interval such as each 0.2 seconds (operation at 5 Hz).

Since the exterior orientation parameters (position and attitude) of the camera 104 relative to the vehicle 100 are already known, by determining the location and the attitude of the vehicle, data of the location and the attitude of the camera 104 is obtained (step S102). Then, the position data of the sun at time "t" is obtained (step S103). The position data of the sun is calculated by the sun position calculating unit 113.

After the position of the sun is calculated, the calculated position of the sun is projected on the photographed image (step S104). The processing of this step is performed by the sun position projecting unit 114. Next, the direction of the sun from the location of the camera is identified (step S105). The processing of this step is performed by the sun direction calculating unit 115. After the direction of the sun as viewed from the camera location is identified, the image that contains this direction of the sun is analyzed, and a brightness value of the image is measured (step S106). The processing of this step is performed by the brightness measuring unit 116.

Then, whether the brightness value that is measured in step S106 is not less than a predetermined threshold value is evaluated (step S107). The processing of this step is performed by the brightness evaluating unit 117. When the brightness value is not less than the threshold value, a visual field area of a rectangular shape or a circular shape having the direction of the sun at the center is set, and a restriction is applied so that the laser scanner 105 will not scan the set area or point cloud data will not be obtained from within the set area (step S108). The processing of this step is performed by the scan condition setting unit 118. When the brightness value that is measured in step S106 is less than the threshold value, the restriction for the laser scanning is not applied, and the laser scanning will be performed in the condition in which the sun is not particularly avoided.

Figure 4:
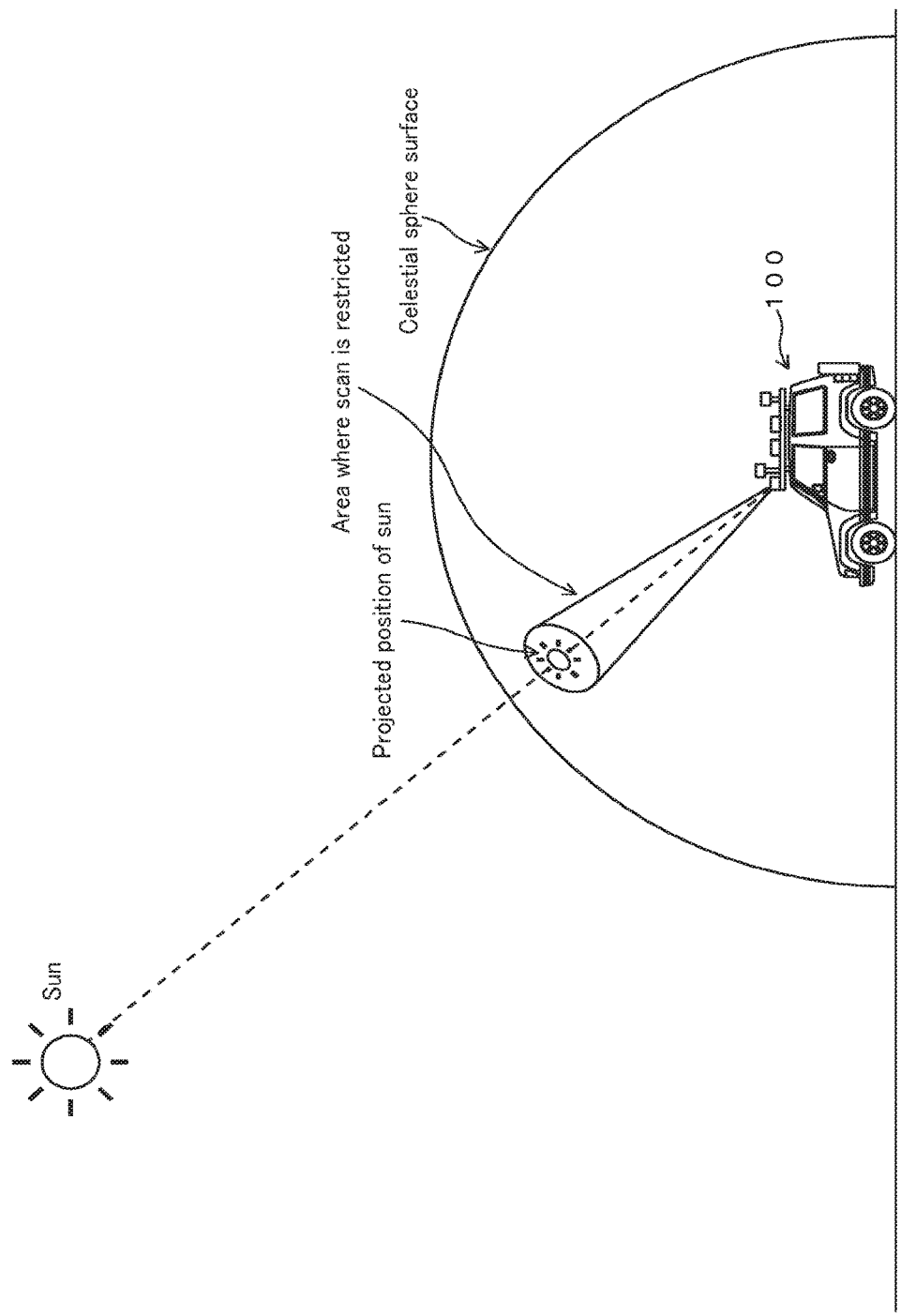
FIG. 4 is a conceptual diagram showing a principle for restricting scanning in an embodiment.

As the restriction for the scanning processing, which is set in step S108, for example, an area having an angular range of ±5 degrees in the vertical direction and ±5 degrees in the horizontal direction is set while the direction of the sun is positioned at the center of the area, and the laser scanning is not performed in this area. FIG. 4 shows an example of a case of setting an area for restricting the scanning.

In the above processing, since the distance between the laser scanner 105 and the camera 104 is sufficiently smaller than the distance of the sun from each of the laser scanner 105 and the camera 104, the direction of the sun as viewed from the laser scanner 105 is considered to be the same as the direction of the sun as viewed from the camera 104.

The processing shown in FIG. 3 is performed at a predetermined time interval according to the timing of the laser scanning that is repeatedly performed. For example, when the laser scanning is performed at a cycle of 5 Hz, the processing shown in FIG. 3 is also intermittently performed at a cycle of 5 Hz, and whether to limit the scan area is evaluated at each 0.2 seconds. The interval of the processing is not limited to 5 Hz and may be another cycle. Alternatively, the processing shown in FIG. 3 may be performed at a necessary timing. In addition, the cycle of repeating the processing shown in FIG. 3 may be made variable. As the cycle of the processing shown in FIG. 3, a short cycle pattern and a long cycle pattern may be prepared, and one of the cycle patterns may be selected according to conditions.

According to the above processing, the restriction is applied so that the laser scanning will not be performed in a specific area having the direction of the sun at the center, the scan data of the specific area will not be obtained, or the scan data of the specific area will not be used, whereby generation of noise due to sunlight is reduced. Moreover, the brightness in the direction of the sun is evaluated at a predetermined time interval, whereby omission of scan information is reduced to a minimum. Furthermore, since the evaluation regarding the limitation of the scan area is performed based on the brightness information, in the condition in which noise is unlikely to be generated by sunlight, such as a case in which the sun is obscured by a cloud, the scan area is not limited, whereby omission of scan data is prevented.

What is claimed is:

1. A device for controlling a laser scanner by using a camera, the laser scanner and the camera respectively having exterior orientation parameters that are known in advance, the device comprising circuitry configured to perform as:
   a sun position calculator that calculates a position of the sun on the celestial sphere surface as viewed from the camera, from astronomical information that is known in advance;
   a brightness calculator to measure brightness, at a position corresponding to the position of the sun on the celestial sphere surface, in an image that is obtained by the camera to contain a direction of the sun; and
   a scan controller that sets a condition for restricting the laser scanner from emitting measurement laser light for laser scanning in the direction of the sun when the brightness is not less than a predetermined threshold value.

2. A method for controlling a laser scanner by using a camera, the laser scanner and the camera respectively having exterior orientation parameters that are known in advance, the method comprising:
   calculating a position of the sun on the celestial sphere surface as viewed from the camera, from astronomical information that is known in advance;
   measuring brightness, at a position corresponding to the position of the sun on the celestial sphere surface, in an image that is obtained by the camera to contain a direction of the sun; and
   setting a scan condition for restricting the laser scanner from emitting measurement laser light for laser scanning in the direction of the sun when the brightness is not less than a predetermined threshold value.

3. A computer program product comprising a non-transitory computer-readable medium storing computer-executable program codes for controlling a laser scanner by using a camera, the laser scanner and the camera respectively having exterior orientation parameters that are known in advance, the computer-executable program codes comprise program code instructions for:
   calculating a position of the sun on the celestial sphere surface as viewed from the camera, from astronomical information that is known in advance;
   measuring brightness, at a position corresponding to the position of the sun on the celestial sphere surface, in an image that is obtained by the camera to contain a direction of the sun; and
   setting a scan condition for restricting the laser scanner from emitting measurement laser light for laser scanning in the direction of the sun when the brightness is not less than a predetermined threshold value.

* * * * *